United States Patent
Jensen (10) Patent No.: US 7,305,650 B1
(45) Date of Patent: Dec. 4, 2007

(54) DATA PATH SYNTHESIS APPARATUS AND METHOD FOR OPTIMIZING A BEHAVIORAL DESIGN DESCRIPTION BEING PROCESSED BY A BEHAVIORAL SYNTHESIS TOOL

(75) Inventor: Mark A. Jensen, Pittsburgh, PA (US)

(73) Assignee: C2 Design Automation, Redmond, WA (US)

( * ) Notice: Subject to any disclaimer, the term of this patent is extended or adjusted under 35 U.S.C. 154(b) by 125 days.

(21) Appl. No.: 11/157,181

(22) Filed: Jun. 20, 2005

Related U.S. Application Data (60) Provisional application No. 60/581,862, filed on Jun. 21, 2004.

(51) Int. Cl.
    *G06F 17/50* (2006.01)
(52) U.S. Cl. ............................................. 716/18; 716/2
(58) Field of Classification Search .................... 716/2, 716/16–18
    See application file for complete search history.

(56) References Cited

U.S. PATENT DOCUMENTS

| | | | |
|---|---|---|---|
| 6,298,472 B1* | 10/2001 | Phillips et al. ................ | 716/18 |
| 6,314,553 B1* | 11/2001 | Stevens et al. ............... | 716/18 |
| 6,505,339 B1* | 1/2003 | Miller et al. .................. | 716/18 |
| 6,745,160 B1* | 6/2004 | Ashar et al. .................. | 703/14 |

* cited by examiner

*Primary Examiner*—Jack Chiang
*Assistant Examiner*—Binh Tat
(74) *Attorney, Agent, or Firm*—Seed IP Law Group PLLC

(57) ABSTRACT

A data path optimization element is used in a behavioral synthesis process to optimize portions of an algorithmic description of a digital logic circuit. Directives are provided in the algorithmic description to identify subsets of the algorithmic description that can be extracted and optimized. The optimization includes identification of certain operators, function calls, conditional statements, or other relationships in the subset, and then compression of the extracted subset into or more data path components in a building block. The building block thus generated is substituted back into the algorithmic description and used in subsequent operations during the behavioral synthesis process, thereby leading to a more optimum design in terms of area, performance, power characteristics, or other characteristic(s).

24 Claims, 3 Drawing Sheets

DATA PATH SYNTHESIS APPARATUS AND METHOD FOR OPTIMIZING A BEHAVIORAL DESIGN DESCRIPTION BEING PROCESSED BY A BEHAVIORAL SYNTHESIS TOOL

CROSS REFERENCE TO RELATED APPLICATION

This application claims benefit under 35 U.S.C. § 119(e) from U.S. Provisional Patent Application Ser. No. 60/581, 862, entitled "DATAPATH SYNTHESIS TOOL AND METHOD FOR OPTIMIZING A BEHAVIORAL DESIGN DESCRIPTION BEING PROCESSED BY A BEHAVIORAL SYNTHESIS TOOL," filed Jun. 21, 2004, assigned to the same assignee as the present application, and incorporated herein by reference in its entirety.

TECHNICAL FIELD

The present disclosure relates generally to behavioral synthesis processes for generating hardware electronic circuit designs from algorithmic descriptions, and more particularly but not exclusively, relates to techniques for optimizing a behavioral design description of an electronic digital circuit.

BACKGROUND INFORMATION

Behavioral synthesis is a technology that allows circuit designers to express hardware design functionality in algorithmic terms, and then transform that functionality into a structure that permits implementation in actual hardware, such as logic circuits. Behavioral synthesis is used as part of a behavioral design flow that promises to raise the level of abstraction of the design process for modern digital circuits. Through behavioral synthesis, designer productivity can be increased and the opportunity for error can be reduced.

Starting with an algorithmic description of a digital design function in a high-level language, behavioral synthesis tools automatically create, from the algorithmic description, the cycle-by-cycle detail needed for hardware implementation. Typically, the high-level algorithmic description of a design is encoded using C or C++ or another high-level language, and is then converted by the behavioral synthesis tools into lower-level abstractions that can be used by other parts of the process. An example of a lower-level abstraction is a register transfer level (RTL) implementation, which may be embodied in a description language such as Verilog or others. Another example of a lower-level abstraction is a gate-level description comprising of an interconnected network of models for primitive logic devices.

The behavioral synthesis tools transform un-timed or partially timed functional code into fully timed models. These RTL and gate-level models are used directly in a conventional logic synthesis flow to create a gate-level implementation for the entire design function. Further details about behavioral synthesis can be found throughout existing technical and academic publications.

Improvements, however, are needed in order to optimize the behavioral design process. For example, during the behavioral design process, the C/C++ code in the algorithmic description is often interpreted sequentially or in series by the behavioral synthesis tool(s). The behavioral design process can therefore become lengthy and/or inefficient if the algorithmic description involves hundreds (if not thousands) of lines of code and many repetitive operations, each of which may need to be individually interpreted in sequence/series by the behavioral synthesis tool(s).

BRIEF SUMMARY

One aspect provides a method for a behavioral synthesis process for realizing a digital logic circuit. The method includes identifying at least one subset from a behavioral algorithm that describes functions of the digital logic circuit. The subset includes at least one of these functions. The identified subset is extracted. At least one customized building block component corresponding to the extracted subset is created. The customized building block component includes an equal or greater number of functions at a lower level of abstraction relative to the extracted subset. The created customized building block component is used in the behavioral synthesis process in place of the extracted subset.

In another embodiment, an apparatus includes a tool that creates a customized building block component representing an improved implementation relative to the extracted subset. The improved implementation represented by the customized building block component has any one or more of an improved area, a performance, or a power characteristic

BRIEF DESCRIPTION OF THE SEVERAL VIEWS OF THE DRAWINGS

Non-limiting and non-exhaustive embodiments are described with reference to the following figures, wherein like reference numerals refer to like parts throughout the various views unless otherwise specified.

DETAILED DESCRIPTION

Embodiments of techniques to use a data path synthesis apparatus and method to optimize portions of a behavioral design description being processed by a behavioral synthesis tool are described herein. In the following description, numerous specific details are given to provide a thorough understanding of embodiments. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Unless the context requires otherwise, throughout the specification and claims which follow, the word "comprise" and variations thereof, such as, "comprises" and "comprising" are to be construed in an open, inclusive sense, that is as "including, but not limited to."

The headings provided herein are for convenience only and do not interpret the scope or meaning of the claimed invention.

Figure 1:
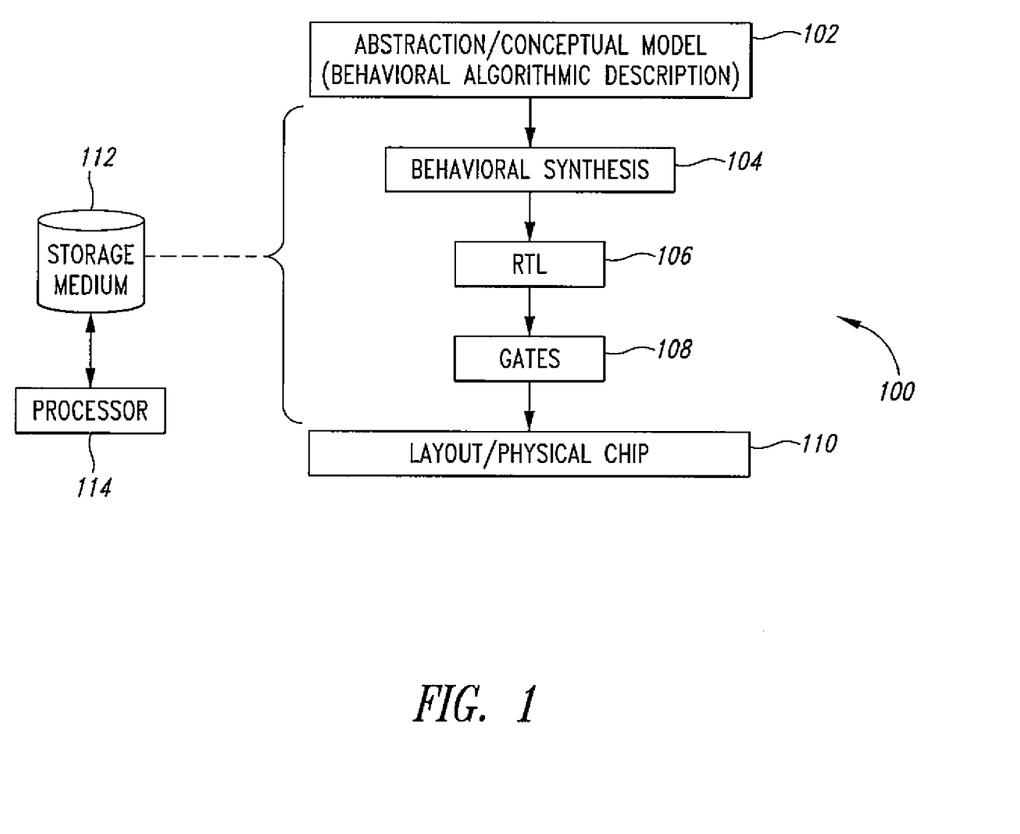
FIG. 1 is a block diagram of an example behavioral synthesis process that can implement an embodiment of a data path optimization element.

As an overview, an embodiment involves the use of a data path synthesis method and/or apparatus (sometimes referred to herein as a "data path optimization element") to optimize portions of a behavioral design description being processed by a behavioral synthesis tool during a behavioral design process. Further details about behavioral synthesis can be found in Michael Meredith, "A Look Inside Behavioral Synthesis," EEdesign.com, Apr. 8, 2004. An example behavioral design process 100 in which an embodiment of the data path optimization element may be implemented is shown in FIG. 1.

A first input to the process 100 is a behavioral design description (a behavioral algorithm at a block 102) of a module in a digital circuit design. The design (abstraction at a conceptual level/model) is described using any suitable high-level procedural language that is stored in one or more plain text source files, for example. The complete description of the function of the design can be contained in the source files. A second input (not shown) to the process 100 according to an embodiment is a set of descriptions of library components, each of which defines characteristics of a digital component to be used as a building block in constructing the output design.

One or more tools, such as a software tool (or other machine-readable instruction stored on a machine-readable storage medium 112 and which is executable by one or more processors 114) reads these source files and building block component descriptions as its input specification. The tool begins by parsing the source files and translating them into one or more data structures, such as, for example, a control and data flow graph (CDFG) or other suitable representation of the logical content of the original behavioral algorithm.

The input description for processing by an embodiment of the data path optimization element using behavioral synthesis is thus prepared. Behavioral synthesis at a block 104 is a process that can be performed by many tools that conduct a series of transformations of CDFG data structures to produce a fully scheduled design bound to a set of building block components. However, one embodiment of such a tool is the data path optimization element that performs a process that is more optimized as compared to other tools.

One embodiment of the data path optimization element creates highly optimized custom building block component descriptions as part of the behavioral synthesis process at the block 104. The embodiment of the data path optimization element begins by identifying portions of the CDFG data structures that represent a subset of the original behavioral design description. Several subsets can be specified, each being a contiguous sequence (for example) of statements in the original behavioral design description.

The subsets can include a plurality of statements related by mathematical operators, one or more function calls (including nested function calls), one or more conditional statements, or other algorithmic component and/or combination thereof that can be simplified or otherwise treated as a building block by an embodiment of the data path optimization element. Subsets can be identified by the user via directives or other annotations in the source files, for example. Other identification techniques may be used. In another embodiment, the subsets can be automatically identified by the data path optimization element using a pattern recognition technique or other suitable technique.

An embodiment of the data path optimization element extracts the subsets of the CDFG data structure corresponding to the subsets identified in the source files and creates a customized building block component for each one of the extracted subsets. Instances of these new building blocks are then substituted back into the CDFG structure in place of the extracted subsets. The remaining CDFG structure proceeds through the rest of the behavioral synthesis process 104 with the new customized building block components used to schedule and allocate the final design. Because the original subsets (which included complex relationships of mathematical operators, function calls, conditional statements, etc.) have been replaced with customized building block components, the result is a more optimal design with better performance and area characteristics than a design that has not been optimized by the data path optimization element.

The output of the data path optimization element according to an embodiment is a body of RTL-level code at a block 106 that describes the design, and a set of RTL and/or gate-level code (not shown) describing the building blocks, including the custom building block components that were created. Both of these bodies of code are suitable as input to a wide variety of other downstream tools, including logic synthesis. Such downstream tools generate a gate design at a block 108, which is then transformed into the layout of the physical chip that has the digital circuit thereon.

Figure 2:
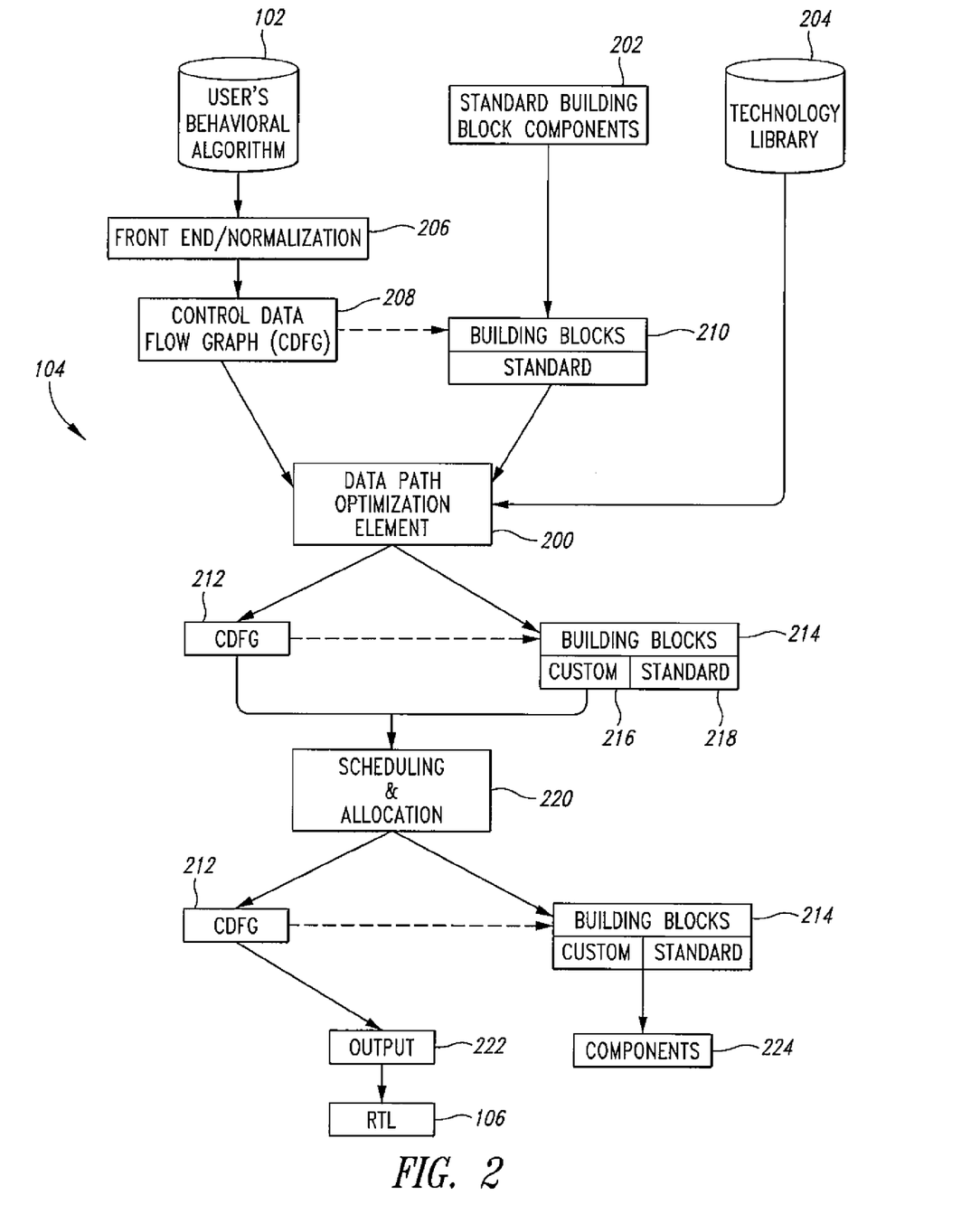
FIG. 2 is a block diagram showing in more detail the behavioral synthesis process of FIG. 1 having an embodiment of the data path optimization element.

FIG. 2 is a block diagram illustrating an example embodiment of the behavioral synthesis process 104 of FIG. 1 in more detail. In an embodiment, one or more elements of FIG. 2 may be implemented in software or other-machine readable instruction stored on the storage medium 112. The various operations shown in FIG. 2 need not necessarily be performed in the exact order shown. Moreover, certain operations and/or elements can be suitably added, removed, modified, and/or combined according to various embodiments.

There are one or more inputs into the embodiment of the behavioral synthesis process 104 shown in FIG. 2. A first input is a user's behavioral algorithm 102. As described above, the behavioral algorithm 102 can comprise an algorithmic description of the functionality of a digital logic circuit to be designed and generated. The behavioral algorithm 102 can be written in C, C++, or any other high-level language that is suitable for describing the functionality of a digital circuit. According to one embodiment, subsets or other portions of the behavioral algorithm 102 can be identified by the user with directives or other annotations, which indicate that such subset(s) can be treated as a building block by a data path optimization element 200 during the behavioral synthesis process 104. In another embodiment, the data path optimization element 200 and/or some other tool in the behavioral synthesis process 104 can use automatic techniques to dynamically identify such subsets, such as by using a pattern recognition technique. Examples of the various directives that can be provided by the user/designer in the behavioral algorithm 102, as well as examples of automatic pattern recognition, will be described in further detail later.

A second input into the behavioral synthesis process 100 is a set of descriptions of library components, each of which defines characteristics of a digital component to be used as a building block in constructing the output design. According to one embodiment, such building block component can be provided by way of standard building block components 202 and/or by way of a technology library 204. The standard building block components 202 can comprise the various building block components (including individual mathematical operators, such as add, subtract, multiply, divide, etc.) that are used in conventional behavioral synthesis processes. The technology library 204 of an embodiment can include such standard building block components 202, and also customized building block components according to various embodiments of the invention.

In one embodiment, the standard building block components 202 and/or the technology library 204 comprise elements that are external to the tools that are involved in the behavioral synthesis process 104. Such external elements can be called or otherwise accessed during the behavioral synthesis process 104. Alternatively or additionally, the standard building block components and/or the technology library 204 can be coded into or otherwise integrated within or with the tools of the behavioral synthesis process 104.

The behavioral algorithm 102 proceeds to a block 206 that performs front-end normalization. Next, the behavioral algorithm 102 is transformed into one or more internal data structures used to represent the logical content of the design at a block 208. In one embodiment, CDFG data structures are used to represent the logical content of the behavioral algorithm 102 at the block 208. It is noted that the term "CDFG" is used to describe the context in which one example embodiment operates, but the invention is not dependent on a specific implementation of the CDFG. Embodiments may be implemented based on the presence of some other data structure(s) that contain(s) the same or similar information as is contained in the CDFG, for instance. For the sake of simplicity of explanation and without limiting the invention, embodiments are described herein in the context of CDFG.

If appropriate, some portion of the CDFG 208 can at this point be realized or otherwise represented by one or more building blocks 210 obtained from the standard building blocks 202. For example, there may be portions of the CDFG that can be readily realized by one or more available standard building blocks 210—in such a case, such portions can be replaced with these standard building blocks, and/or such portions can be extracted from the CDFG and replaced with the standard building block(s).

As described above, subsets of the behavioral algorithm 102 may be annotated by the user to identify subsets that can be realized/optimized with customized building block components. Such identification of subsets is carried forward when the transformation to the CDFG 208 is performed. According to one embodiment, the following operations are followed or otherwise performed by the data path optimization element 200 for each subset of statements identified to have an optimized building block component built for it:

The CDFG 208 is input into the data path optimization element 200, and the corresponding bodies of subsets in the CDFG 208 are identified. The standard building blocks 210 and/or information from the technology library 204 may also be provided to the data path optimization element 200.

The inputs and outputs of each subset are identified. These will become the input and output ports of the customized building block component(s).

A set of tests is performed to identify whether only supported constructs appear within each subset. A list of supported constructs is given later.

A CDFG section corresponding to the subset is extracted from the main CDFG 208. The result is a CDFG 212 that does not include the extracted CDFG section(s).

A reference to the building block component is left in the place of the extracted CDFG in the CDFG 212.

The extracted CDFG may be translated into an input description format for a data path synthesis tool/module. The data path synthesis tool/module may work directly from the CDFG data structures in one embodiment. A description of data path synthesis, which is used to generate a data path component for a customized building block, follows later.

The data path synthesis tool/module is executed on the extracted CDFG that has been translated into the input description format. The data path synthesis tool/module produces a highly optimized gate-level implementation of the extracted CDFG with accurate timing and area estimates. In one embodiment, this process involves generation of one or more customized building block components 214. The customized building block components 214 can be made up of either or both custom data path components 216 and standard data path components 218.

The newly built data path component(s) 216/218 and its timing and area metrics are made available for use in the rest of the behavioral synthesis flow as building block components 214.

During scheduling (e.g., deciding which clock cycles in which to execute a data path component of the design) and allocation (e.g., mapping the data path component to actual circuit parts) processes of behavioral synthesis at a block 220, the new building block components 214 are used in the places in the CDFG 212 where references were created for them. Multiple instances of the same building block component 214 are instantiated if appropriate, and instances of building block components 214 may be shared if there are separate uses of the building block components 214 with different lifetimes.

In the final design, instantiations of the new building block components are included as part of a final output 222. The final output 222 is provided for an RTL-level abstraction 106. Building block components are instantiated in the RTL-level description of the design. A gate-level, an RTL-level and a behavioral-level model may be available for each new building block component. The appropriate version of each model is instantiated as required by individual tools that will process the RTL-level description of the design. For example, a gate-level model may be used for logic synthesis of the design, while a behavioral model may be used for logic simulation. Some or a portion of the building block components 214 can be made available to the same or to a different behavioral synthesis process as components 224. For example, the building block components generated for one design may have applicability or use with some other design, and therefore, the components 224 can be stored and used during synthesis of that other design as appropriate.

It is noted that some behavioral synthesis tools do not generate RTL-level abstractions, but rather, the behavioral synthesis process proceeds directly to gates. An embodiment of the invention is provided for such a behavioral synthesis process where there is a direct path to gates after the building block components 214 are generated. Thus in FIG. 2, it is understood that the flow going through the RTL-level abstraction 106 is merely illustrative of a possible implementation, and that the embodiment of FIG. 2 can be modified to provide a direct path to a gate-level abstraction, alternatively or additionally to the RTL-level abstraction 106.

Moreover, it is noted that an RTL-level description that instantiates building blocks is only one possible example. In another embodiment, the design may be described at the gate level, the RTL level, or any other suitable level of abstraction or combinations thereof. The design that implements the building block components 214 (having the custom data path components 216) can be represented in any form that is suitable for implementation using design tools familiar to those skilled in the art having the benefit of this description.

As described above, an embodiment of the data path optimization element processes the CDFG 208 to determine if the CDFG contains supported constructs that can be realized as customized building block components 214 that results in optimization (e.g., smaller and faster design). One embodiment supports a wide variety of behavioral language constructs that may be included in the code (e.g., the behavioral algorithm 102 and/or the CDFG 208) that is input to the behavioral synthesis process 104. These language constructs include but are not limited to the following:

- An arbitrary number of input and output variables. Inputs are variables set outside the block and read within it, and outputs are variables set inside the block and read outside of it.
- Subroutine calls to functions whose bodies also meet these minimum guidelines.
- Local variables
- All standard arithmetic and logical operators.
- If/then/else and switch control constructs, nested arbitrarily deeply.
- Shifting, concatenation, and bit selection operators.
- sqrt( ) function calls.
- Loops that can be unrolled.
- Array accesses as long as the elements of the arrays are flattened (represented as individual registers), or are arrays of bits.
- Pointers that can be statically resolved to storage within the same body of code.
- Accesses to un-flattened const arrays (ROMS) are supported through ROM constructs (optimized constant mux trees)—built by the data path optimization element 200. This is possible because ROMs may be duplicated without changing the design functionality (like other standard FU operations.)

As described above, a data path synthesis process is used to generate the custom data path components 216 of the customized building blocks 214. Data path synthesis has the following characteristics in an embodiment:

- The process builds highly optimized gate-level implementations targeted at a particular chip manufacturer's technology library at a particular clock frequency.
- The process is targeted at data path-only applications that do not require a finite state machine.
- Logic is highly optimized for the specific bit widths of the data being operated on, and the values of constants.
- The process can build both asynchronous and multi-cycle parts.
- Parts can be pipelined if they require multiple clock cycles.

There are several options that comprise part of one embodiment that can affect how data path synthesis is used in the process:

- An option controlling the speed vs. area characteristics of the result that is to be produced by data path synthesis.
- The option to consider constant input values at the inputs to the building block. If more than one use of a building block occurs in a design, then including constant values particular to each use when building the block may result in fewer sharing opportunities, but more highly optimized blocks. One solution is design dependent.
- The option to consider differing bit widths at the inputs and outputs of the building block. Similar to constant value consideration, consideration of bit widths may result in smaller components but fewer sharing opportunities.

Figure 3:
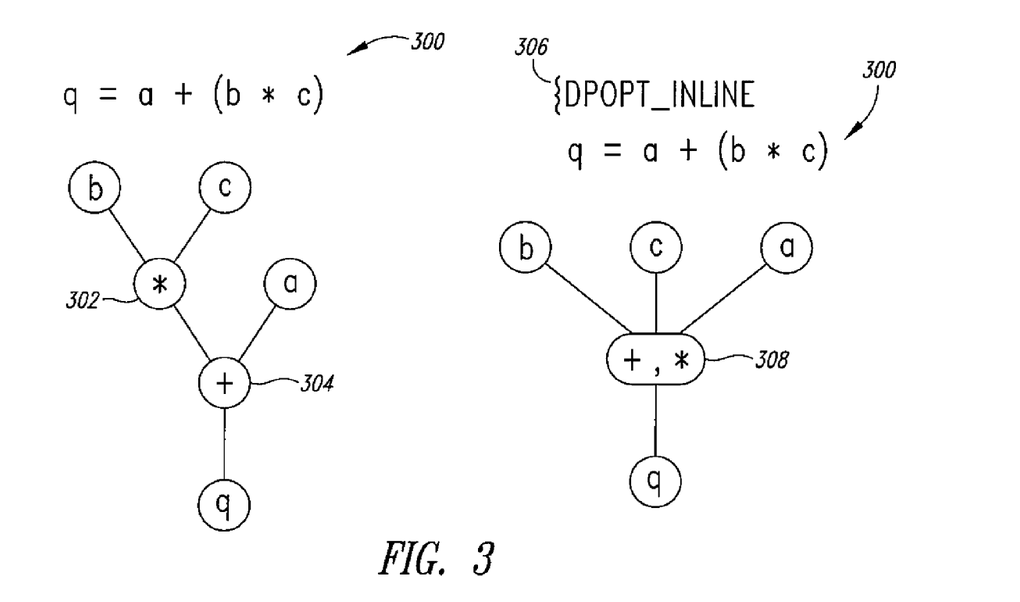
FIG. 3 illustrates an example generation of building blocks by an embodiment of the data path optimization element.

FIG. 3 provides another illustrative example of the manner in which the data path optimization element 200 can create custom data path components that provide a more optimized design. For instance, the combination of certain operations is sometimes smaller and faster than the sum of the individual operations.

In FIG. 3, a relationship 300 in the CDFG 208 may for example comprise $q=a+(b*c)$. The relationship 300 thus includes two mathematical operators * and + that are represented or otherwise realized by two building blocks 302 and 304, respectively, in a conventional behavioral synthesis flow.

FIG. 3 also shows how the relationship 300 can be optimized in accordance with an embodiment. A directive 306 or other annotation in the CDFG 208 identifies the relationship 300 or other subset of the CDFG 208 that is to be optimized with a custom building block component 216. The data path optimization element generates a single (1) building block 308 that includes the combination of + and *.

Therefore in both examples shown in FIG. 3, the output q and the inputs a, b, and c are the same. However, the optimized embodiment has reduced the number of building blocks from two (e.g., the building blocks 302 and 304) to one (e.g., the building block 308).

By extracting data path components from the CDFG 208, the resulting design can be improved in several ways:

- The total size of the design may be reduced because the customized building block components 216 are smaller than the standard building block components that would have been used in their place without an embodiment of the invention.
- The latency of the design may be reduced because the customized components are faster than the components that would have been used without an embodiment of the invention.
- The design can be more fully pipelined because of the simplification of the remaining CDFG 212, and the pipelined nature of the building blocks 214 built by an embodiment of the invention.
- More elements of the design might be executed in parallel because the remaining CDFG 212 become simpler after use of one embodiment of the invention.
- The processing time of the entire behavioral synthesis run may be reduced because the remaining CDFG 212 become simpler after use of one embodiment of the invention.
- The processing time of the logic synthesis tool that processes the output of behavioral synthesis may be reduced because the circuit containing optimized component instantiations will be smaller and simpler.
- Timing closure may be easier to reach during the physical design process because more accurate timing metrics are made available by data path synthesis during the behavioral synthesis process.

In an embodiment of a customized data path component, the data path component can have many more functions, where each of the functions is at a much lower level of abstraction than in the functions in the extracted subset. For example, if the function is "a+b," the corresponding data path component can contain many lower level functions like AND and OR gates that implement the addition (+) operation. The customized data path component, which is used as a part of a building block component in an embodiment, implements the same or similar function as those in the extracted subset, but with more attractive area, performance, power characteristic, or other characteristic(s).

Figure 4:
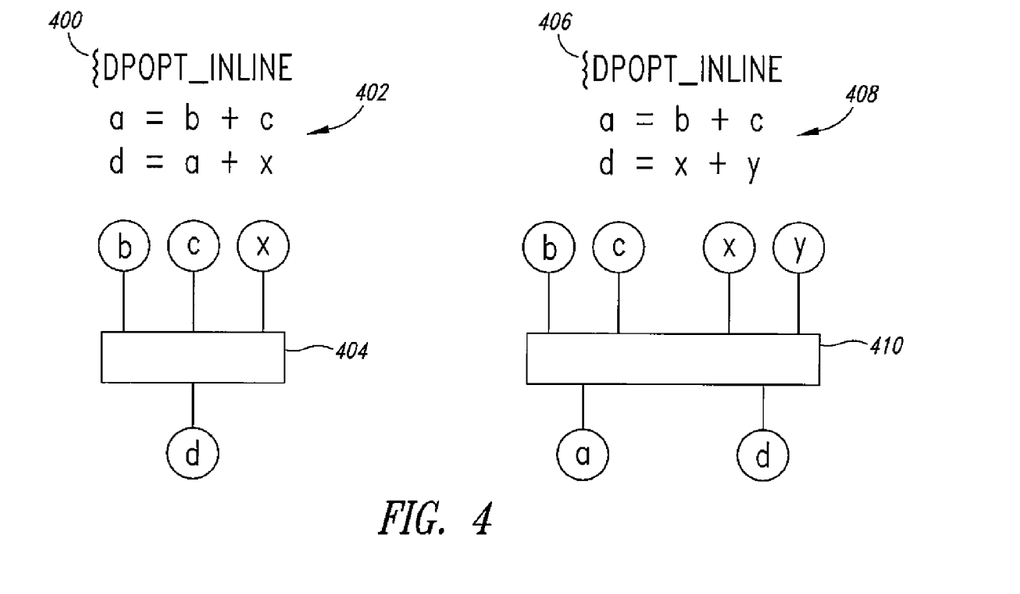
FIG. 4 illustrates examples of building blocks having inputs and outputs according to various embodiments of the data path optimization element.

FIG. 4 illustrates inputs and outputs of two example custom data path components that can be used for building block components 216. In the first example, a directive 400 identifies a relationship 402 that is to be optimized. In this example, the relationship 402 comprises a=b+c and d=a+x, which is optimized to obtain a single customized data path component 404 that represents the two + operators in the original relationship.

The second example of FIG. 4 uses a directive 406 to identify a relationship 408 that comprises a=b+c and d=x+y. A single customized data path component 410 is generated by the data path optimization element 200 for the two + operators in the original relationship 408. The generated customized data path component 410 includes a plurality of outputs a and d.

Additional details of one or more embodiments of the data path optimization element 200:

Data Path Optimization

The data path optimization element 200 of one embodiment (sometimes referred to herein as "DpOpt") is an advanced data path synthesis engine fully integrable with a behavioral synthesis engine. As described above, one embodiment of the data path optimization element 200 takes a portion of the behavior and the technology library (e.g., *.lib or *.fdb) as inputs and produces an optimized data path component 216. This data path component 216 is then available for the behavioral synthesis engine to use as it synthesizes the design, in the same way it uses adders or multipliers, for example. The behavioral synthesis engine will choose to use zero, one, or more of the custom data path components 216 as it sees fit in order to meet the given performance constraints for the design.

Usage

This feature can be fully directed by the user, so that the designer can leverage his or her expertise by telling the data path optimizer element 200 to create components for certain sequences of operations. This gives rise to two example use models for data path optimization.

First, the designer can direct the tool to create an automated component for a function that is called several times in the behavior. The butterfly computation in a fast Fourier transform (FFT) and the add/compare/select (ACS) in a Viterbi decoder are two examples of this use model. The data path optimizer element 200 creates optimized netlists for these common operations, which can then be shared or duplicated as necessary. For example, depending on the performance requirements for an FFT, it may require 1, 2, 4, or more butterfly computations to be executed in parallel. This use model tends to help performance and area by reusing a highly optimized data path component as much as possible.

A second use is for the designer to specify large portions of code for data path optimization when there is little sharing to be done. For example, in a fully pipelined design (initiation interval=1), no real sharing can be done. In such a case, if the behavior is logically partitioned by the designer into possible pipeline stages, then better results can often be obtained by specifying that each partition should be implemented as a data path component.

Additional examples are provided next. Further details can be obtained from Behavioral Design Suite User's Guide Version 2.2, Chapter 4: Defining Cynthesizer Modules and Directives for Exploration, page 95 et seq., available from Forte Design Systems, Inc. (www.forteds.com).

One embodiment of the data path optimization technology is controlled by the use of the CYN_DPOPT_INLINE directive. The behavior of data path optimization is affected by the -dpopt_adder_arch command line flag described on page 298 of the BDS User's Guide.

Syntax

An example syntax for specifying a portion of behavior to pass to the data path optimization element 200 is similar to other directives. It is written as a function call, and it applies to the scope it is in (bounded by braces "{" "}").

CYN_DPOPT_INLINE (int config, const char* part
    Name, const char* messageForReport);

Parameters config

Configurations that control how parts are created with DpOpt:

DPOPT_NO_TRIMMING, DPOPT_NO_CONSTANTS, or 0 (zero).

partName

The part Name defines the name of the custom data path component. In other words, the data path component will be placed in a module named as the specified part Name.

messageForReport

This argument is optional and used for reporting, as with all other directives.

Explanation

The CYN_DPOPT_INLINE is an example syntax of a directive that is used to build very efficient data-path components for the C++ code inside the braces. If this directive is placed in a function, for example, then a part will be created for each call to the function, except where there exists the possibility of sharing the data-path parts between various calls.

Additional feature of embodiments—see also for example page 96 of Chapter 4: Defining Cynthesizer Modules and Directives for Exploration from the Behavioral Design Suite User's Guide Version 2.2.

However, each part created for each call to the function may not be created the same. The data path optimizer element 200 is intelligent enough to not simply build a part for the function itself, but to also consider the environment of the call when building the part. The data path optimizer element 200 will take into account whether some of the arguments are constants and whether the arguments actually contain fewer bits than the parameter definitions inside the functions. By doing this, the data path optimizer element 200 can build the most optimal part possible for each call.

So, to reiterate for an example embodiment, the structure of the part that is actually created when a function is mapped to a part with CYN_DPOPT_INLINE is based not only on the internals of the function, but also on the context of the call to the function and the nature of its arguments. An example:

sc_uint<8>add(sc_uint<8>a, sc_uint<8>b) {CYN_DPOPT_INLINE(0, "add_part", " ");
    return a+b;
}

Here is a simple ADD function that takes two 8-bit arguments and adds them together. If one is to think about what part this Would create, then one would imagine a simple adder that accepts two 8-bit arguments and produces an 8-bit result. With 2 calls to this function like:

sc_uint<8>x,y,s,t;
    s=add(0,x);
    t=add(1,y);

The data path optimizer element 200 can actually create two different custom data path components 216. The first component will add an 8-bit input to the constant "0" and the second component will add an 8-bit input to the constant "1". The constants arguments are "pushed-through" the creation of the part. Each of these adders will be much smaller than the 8*8=8 bit adder. However, since they actually have different functionality, they are not shared in one embodiment.

The data path optimizer element 200 of an embodiment treats arguments of different widths in the same way. The data path optimizer element 200 will attempt to create different parts for each call depending on the actual widths of the arguments rather than the widths of the named inputs to the function. For example:

According to Chapter 4 (page 97): Defining Cynthesizer Modules and Directives for Exploration of the Behavioral Design Suite User's Guide Version 2.2:

sc_uint<8>x,y,s,t;
    sc_uint<4>z;
    s=add(x,y);
    t=add(z,y);

In this case, the first call would create an 8*8=8 bit adder, and the second call would create a 4*8=8 bit adder. With this bit-trimming algorithm in place, the second component created will be smaller than the first components, but the components are not shared.

It is possible, however, to override this default behavior of CYN_DPOPT_INLINE in an embodiment. The designer can control whether constants are propagated into DpOpt parts and whether bit trimming of inputs will be propagated. This can improve sharing of parts (by making sure that all calls map to exactly the same functionality). This can be controlled directly in the CYN_DPOPT_INLINE directive in an embodiment.

For example:
    sc_uint<8>add(sc_uint<8>a, sc_uint<8>b) {
    CYN_DPOPT_INLINE
(DPOPT_NO_TRIMMING|DPOPT_NO_CONSTANTS, "add_part"," ");
    return a+b;
    }

In this case, the flags are included in the directive to indicate that neither constant propagation nor bit trimming will affect the parts constructed.

There are two flags in an embodiment that may be included as the config parameter in the CYN_DPOPT_INLINE directive. These flags may be included individually or together via the bitwise-OR operator (as shown in the example above). The flags are:

DPOPT_NO_TRIMMING. Do not trim input or output port widths of the newly created part.
    DPOPT_NO_CONSTANTS. Do not propagate constants into newly created parts.

To use default settings for CYN_DPOPT_INLINE, specify "0" as the config.

As another example from Chapter 4 (page 98): Defining Cynthesizer Modules and Directives for Exploration from Behavioral Design Suite User's Guide Version 2.2:

{
    CYN_DPOPT_INLINE(0, "myPart", "mypart message");

a=b*c+d*17;
    tmp=b+d;
    if(e){
    a=a+tmp; // value of "a" is defined
    }
    }
    . . .
    . . . =a; // value of "a" is used, "tmp" is never used This will create a gate-level part named mypart with four inputs (of the types of b, c, d, e) and one output (of the same type as a). In this case, a is the only output since it is the only variable whose value is defined in this block and used elsewhere. Note that since this directive is applied to code between the surrounding braces, the input for DpOpt need not be separated as a function. This directive can be applied to an arbitrary block of code simply by bounding it with braces.

Other embodiments of the data path optimization element 200 is based on one or more of the following example directives, which may be annotated by the user into the behavioral algorithm 102:

DPOPT_INLINE Directives
Syntax
CYN_DPOPT_INLINE (int config, const char* part Name, "char* string");
Parameters
config
Configurations that control how parts are created with DpOpt.
part Name
The name of the custom datapath component. In other words, the datapath component will be placed in a module named as the specified part Name.
char* string
An optional message used for reporting purposes.
Description
An embodiment of the datapath optimization technology is controlled by the use of the CYN_DPOPT_INLINE directive. The part Name specifies the name of the custom datapath component, and the string provides an optional message for use during reporting.

There are several example flags that may be included as the config parameter in the CYN_DPOPT_INLINE directive according to an embodiment. These flags may be included individually or together via the bitwise-OR operator.

The example flags are:
DPOPT_NO_TRIMMING. Instructs DpOpt to not trim input or output port widths of the newly created part. This value is used if there will be multiple instances of the generated block that will use different input/output widths, up to the maximum.
DPOPT_NO_CONSTANTS. Instructs DpOpt to not propagate constants into newly created parts. This value is used if there will be multiple instances of the generated block and each will not have the same constant inputs
DPOPT_OPTIM_AREA. Instructs DpOpt to produce for minimum area. If used in conjunction with DPOPT_OPTIM_DELAY, DpOpt will produce components that maximize both area and delay. If DPOPT_OPTIM_AREA is not specified, DpOpt will produce for minimum delay.
DPOPT_OPTIM_DELAY. Instructs DpOpt to produce for minimum delay, which is the default setting. If used in conjunction with DPOPT_OPTIM_AREA, DpOpt will produce components that maximize both area and delay.

DPOPT_DEFAULT. Specifies the default settings for CYN_DPOPT_INLINE. The default is to produce only for minimum delay (DPOPT_OPTIM_DELAY).

An embodiment of the data path optimization element 200 automatically unrolls loops within CYN_DPOPT_INLINE blocks if the number of iterations can be determined. No loop unrolling directives are necessary. Note that the DPOPT_OPTIM_AREA and DPOPT_OPTIM_DELAY flags determine the initial choice of cells to implement a part's functionality. DPOPT_OPTIM_AREA starts with the smallest cells and DPOPT_OPTIM_DELAY starts with the fastest cells.

However, these flags are just one part of the optimization process. For example, if one is to map to the smallest cells in addition to optimizing with a fast timing constraint, one should be able to get a fast circuit, but the optimization will take longer than if one had mapped to the fastest cells.

Both DPOPT_OPTIM_AREA and DPOPT_OPTIM_DELAY can be specified at the same time to force DpOpt to find both the smallest and fastest solution for the generated part.

Array flattening is implied with the use of CYN_DPOPT_INLINE.

Another example directive related to delay is CYN_DPOPT_OUTPUT_REQUIRED (delay). The delay argument in the parenthetical specifies a delay that constrains the timing of a part that is to be constructed. For example, if a clock cycle is 10 ns, and the designer wishes to construct a particular part within that clock cycle, along with an adder (1 ns) and a multiplier (1 ns), then the particular part is constrained to delay=8 ns, so that all three parts can be constructed in the 10 ns clock cycle.

As described above, the various directives described previously and/or other annotations can be placed by the user in the behavioral algorithm 102 to identify subsets that can be optimized with a customized building block component. Alternatively or additionally in an embodiment, the identification of the subsets can be performed automatically rather than having the user physically insert directives into the behavioral algorithm 102. Such an embodiment involved a dpopt-arith feature or other feature of the data path optimization element 200 that uses pattern recognition techniques.

For instance, the combination of certain operations is sometimes smaller and faster than the sum of the individual operations. An embodiment of dpopt_arith tries to take advantage of that by creating custom data path components suitable for the current design. These data path components combine certain operations to take advantage of constant folding operations at the gate level, carry save and balancing optimizations, and removal of paths to unused bits.

With dpopt_arith, the data path optimization element 200 automatically searches through the design for patterns of operator combinations that appear frequently in the design (no user specification of part boundaries is required). A new data path component is created for each of the patterns and placed in the library (e.g., the building block library 204), usually resulting in a shorter latency. Based on the design itself, the area may increase or decrease.

An embodiment of dpopt_arith functions as follows:

Constants are merged with operators they feed in order to take advantage of constant folding operations at the gate level.

Arithmetic operations are merged with other arithmetic operations and comparators to take advantage of carry save and balancing optimizations.

All operations are merged with constant right shift and range operations in order to allow for the removal of paths to unused bits of the result.

The patterns that are used to search a C++ code can be programmed into the data path optimization element 200 and are not contained in any external "pattern file" in one embodiment. In another embodiment, patterns can be externally accessed by the data path optimization element 200. The complexity of these patterns is quite low in one embodiment. The patterns of such simpler embodiments do not include any multi-statement patterns and will not cross function-call boundaries. Other embodiments can be utilized with more complex patterns.

An automated pattern recognition technique of an embodiment is not limited to the recognition of simple C++ expression, for instance, but rather, incorporates patterns that include more sophisticated code structures. Such code structures include, but not limited to, multiple C++ statements, control statements (e.g., "if and "switch"), arbitrarily deep function calls, and array accesses, and so forth.

The above description of illustrated embodiments is not intended to be exhaustive or to limit the invention to the precise forms disclosed. While specific embodiments and examples are described herein for illustrative purposes, various equivalent modifications are possible within the scope of the invention and can be made without deviating from the spirit and scope of the invention.

For example, while specific syntax have been provided herein for various directives, such specific syntax are intended for illustrative purposes. Other embodiments can use similar or completely different syntax for their directives, functions, operations, or other features of the data path optimization element 200.

As another example, various embodiments have been described in the context of C or C++ implementations. It is appreciated that such implementations are merely illustrative and that various embodiments can be provided for other types of languages and/or data structures.

These and other modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

What is claimed is:

1. A method for a behavioral synthesis process for realizing a digital logic circuit, the method comprising:

identifying at least one subset from a behavioral algorithm that describes functions of the digital logic circuit, the subset including at least one of these functions;

extracting the identified subset from a data structure representation of logical content of the behavioral algorithm;

creating at least one customized building block component corresponding to the extracted subset, the customized building block component having an equal or greater number of functions at a lower level of abstraction relative to the extracted subset; and using the created customized building block component in the behavioral synthesis process in place of the extracted subset, including:

providing a reference in the data structure representation, where the subset was extracted therefrom, that corresponds to the created customized building block component;

providing the customized building block component and the data structure representation having the reference to the customized building block component to a scheduling and allocation process; and providing an output of the scheduling and allocation process to a subsequent level of abstraction in the behavioral synthesis process.

2. The method of claim 1 wherein the at least one function of the extracted subset includes at least one statement having a mathematical operator element present in any one or more of a function call element, a nested function call element, a conditional statement element, a loop element, an array element, a bit-level manipulation expression element, elements from a plurality of statements from the behavioral algorithm, and a relationship element.

3. The method of claim 1 wherein the at least one function of the extracted subset includes a sequence of mathematical operator elements.

4. The method of claim 1 wherein identifying at least one subset from the behavioral algorithm includes identifying the subset by locating an annotation in the behavioral algorithm that corresponds to the subset.

5. The method of claim 2 wherein identifying at least one subset from the behavioral algorithm includes automatically identifying the subset by using a pattern recognition technique to identify a subset containing at least some of the elements, wherein the identified subset includes more than one statement.

6. The method of claim 1 wherein the data structure representation comprises a control and data flow graph (CDFG) representation.

7. The method of claim 1 wherein the subsequent level of abstraction comprises either or both a register transfer level (RTL) implementation and a gate-level implementation.

8. The method of claim 1, further comprising specifying an amount of delay within a clock cycle in which to create the customized building block component.

9. The method of claim 1 wherein the subset comprises a plurality of statements in the behavioral algorithm.

10. The method of claim 1 wherein creating the customized building block component includes combining a plurality of functions in the subset into a single customized building block component.

11. An article of manufacture, comprising:

a machine-readable medium having instructions stored thereon that are executable by a processor in a behavioral synthesis process to synthesize a high-level logic design description of a circuit into a lower-level design, by:

extracting subsets of the design description from a data structure representation of logical content of the design description, the subsets including expressions of functions of the circuit;

performing at least one synthesis process on the extracted subsets to generate corresponding data path components that represent an improved implementation relative to the extracted subsets; and combining the generated data path components with the design description in place of the extracted subsets including:

providing references in the data structure representation, where the subsets were extracted therefrom, that correspond to the generated data path components;

providing the generated data path components and the data structure representation having the references to the generated data path components to a scheduling and allocation process; and providing an output of the scheduling and allocation process to a subsequent level of abstraction in the behavioral synthesis process.

12. The article of manufacture of claim 11 wherein the instructions to combine the generated data path components with the design description include instructions to link the generated data path components back to said references in the design description corresponding to locations of the extracted subsets.

13. The article of manufacture of claim 11 wherein the instructions to perform at least one synthesis process on the extracted subsets to generate corresponding data path components that represent the improved implementation relative to the extracted subsets include instructions to perform the synthesis process to generate data path components representing a plurality of lines of code of the design description and a plurality of functions of the circuit.

14. The article of manufacture of claim 11 wherein the machine-readable medium further includes instructions stored thereon to synthesize a particular data path component within a portion of one or more clock cycles specified by an annotation to the design description.

15. An apparatus for a behavioral design process usable to realize a digital circuit, the apparatus comprising:

a first tool to identify at least one subset from a behavioral algorithm that describes functions of the digital logic circuit, the subset including at least one of these functions;

a second tool to extract the identified subset from a data structure representation of logical content of the behavioral algorithm;

a third tool coupled to the second tool to create at least one customized building block component corresponding to the extracted subset, the customized building block component representing an improved implementation relative to the extracted subset; and a fourth tool coupled to the third tool to use the created customized building block component in the behavioral synthesis process in place of the extracted subset, wherein to perform said use of the created customized building block component in the behavioral synthesis process in place of the extracted subset, said fourth tool is adapted to:

provide a reference in the data structure representation, where the subset was extracted therefrom, that corresponds to the created customized building block component;

provide the customized building block component and the data structure representation having the reference to the customized building block component to a scheduling and allocation element; and provide an output of the scheduling and allocation element to a subsequent level of abstraction in the behavioral design process.

16. The apparatus of claim 15 wherein the first, second, and third tools comprise parts of a data path optimization element to output the customized building block component, along with said data structure representation of logical content of the behavioral algorithm with the subset extracted therefrom, to the fourth tool, which includes said scheduling and allocation element.

17. The apparatus of claim 16 wherein the data path optimization element includes a delay feature to realize the customized building block component within a portion of time of one or more clock cycles.

18. The apparatus of claim 16 wherein the data path optimization element includes a feature that can specify whether the customized building block component is optimized relative to constant values or data path widths at its inputs in specific instances of the extracted subset in the behavioral algorithm.

19. The apparatus of claim 16 wherein the improved implementation represented by the customized building block component has any one or more of an improved area, a performance, or a power characteristic.

20. The apparatus of claim 15 wherein the extracted subset includes a mathematical operator present any one or more of a conditional statement, function call, nested function call, a plurality of inputs and outputs, a loop, an array, a bit-level manipulation expression, and a plurality of statements from the behavioral algorithm.

21. The apparatus of claim 15 wherein the extracted subset includes a sequence of mathematical operators.

22. The apparatus of claim 15 wherein the customized building block component comprises a single data path component representing a plurality of functions and having multiple outputs.

23. The apparatus of claim 15 wherein at least some of the tools comprise parts of a single tool.

24. The apparatus of claim 15 wherein at least some of the tools comprise a plurality of different tools.

* * * * *

UNITED STATES PATENT AND TRADEMARK OFFICE
CERTIFICATE OF CORRECTION

| | | |
|---|---|---|
| PATENT NO. | : 7,305,650 B1 | Page 1 of 1 |
| APPLICATION NO. | : 11/157181 | |
| DATED | : December 4, 2007 | |
| INVENTOR(S) | : Mark A. Jensen | |

It is certified that error appears in the above-identified patent and that said Letters Patent is hereby corrected as shown below:

Title Page
Item (73), Assignee, "C2 Design Automation" should read as -- C2 Design Automation dba Forte Design Systems --

Column 16
Lines 58-61, "provide the customized building block component and the data structure representation having the reference to the customized building block component to a scheduling and allocation element; and" should read as -- provide the reference to the customized building block component to a scheduling and allocation element; and --

Signed and Sealed this

Eighth Day of July, 2008

JON W. DUDAS
*Director of the United States Patent and Trademark Office*